US008168075B2

(12) United States Patent
Laconto et al.

(10) Patent No.: US 8,168,075 B2
(45) Date of Patent: May 1, 2012

(54) METHODS FOR MACHINING INORGANIC, NON-METALLIC WORKPIECES

(76) Inventors: Ronald W. Laconto, Leicester, MA (US); Douglas E. Ward, Santa Ana, CA (US)

( * ) Notice: Subject to any disclaimer, the term of this patent is extended or adjusted under 35 U.S.C. 154(b) by 889 days.

(21) Appl. No.: 11/955,749

(22) Filed: Dec. 13, 2007

(65) Prior Publication Data
US 2008/0153397 A1    Jun. 26, 2008

Related U.S. Application Data

(60) Provisional application No. 60/871,067, filed on Dec. 20, 2006.

(51) Int. Cl.
*B44C 1/22* (2006.01)
*C03C 15/00* (2006.01)
*C03C 25/68* (2006.01)
*C23F 1/00* (2006.01)
*C25F 3/00* (2006.01)

(52) U.S. Cl. ......................................... 216/88; 438/692
(58) Field of Classification Search ............... 216/88; 438/692
See application file for complete search history.

(56) References Cited

U.S. PATENT DOCUMENTS

| | | | |
|---|---|---|---|
| 5,366,542 A | 11/1994 | Yamada et al. | |
| 5,437,887 A | 8/1995 | Yarkosky et al. | |
| 5,549,978 A | 8/1996 | Iwasaki et al. | |
| 5,846,280 A * | 12/1998 | Speit | 65/30.14 |
| 5,999,368 A | 12/1999 | Katayama | |
| 6,007,592 A | 12/1999 | Kasai et al. | |
| 6,033,293 A * | 3/2000 | Crevasse et al. | 451/494 |
| 6,336,945 B1 * | 1/2002 | Yamamoto et al. | 51/309 |
| 6,439,986 B1 | 8/2002 | Myoung et al. | |
| 6,497,611 B2 | 12/2002 | Sakurada et al. | |
| 6,500,049 B2 | 12/2002 | Orii et al. | |
| 6,509,269 B2 * | 1/2003 | Sun et al. | 438/690 |
| 6,604,987 B1 | 8/2003 | Sun | |
| 6,755,721 B2 | 6/2004 | Ward et al. | |
| 2001/0009840 A1 | 7/2001 | Orii et al. | |
| 2001/0044264 A1 * | 11/2001 | Lack et al. | 451/60 |
| 2001/0049913 A1 | 12/2001 | Miyata | |
| 2001/0055938 A1 | 12/2001 | Fujimura et al. | |
| 2002/0031979 A1 | 3/2002 | Sakurada et al. | |
| 2004/0033690 A1 | 2/2004 | Schowalter et al. | |
| 2004/0256595 A1 | 12/2004 | Hamill et al. | |
| 2005/0208883 A1 * | 9/2005 | Yoshida et al. | 451/41 |

FOREIGN PATENT DOCUMENTS

| | | |
|---|---|---|
| DE | 10147897 C | 1/2003 |
| EP | 0401147 A2 | 12/1990 |
| EP | 0280438 A2 | 8/1998 |
| GB | 2398075 A | 8/2004 |
| GB | 2403954 A | 1/2005 |
| JP | 2278822 A | 11/1990 |
| JP | 11-181409 | 7/1999 |
| JP | 2001240850 | 9/2001 |
| KR | 20000024453 | 5/2000 |
| TW | 200613533 | 5/2006 |
| WO | 0112740 A1 | 2/2001 |
| WO | 200136554 A1 | 5/2001 |
| WO | 200174959 A2 | 10/2001 |
| WO | 2004/078410 A | 12/2001 |
| WO | 03031527 A1 | 4/2003 |
| WO | 03031671 A2 | 4/2003 |

OTHER PUBLICATIONS

Honglin Zhu, "Chemical Mechanical Polishing (CMP) of Sapphire," Abstract of Dissertation, 1 p.
Rami Schlair, et al., "An Alumina-Ceria CMP Slurry for Glass," Saint-Gobain Ceramics & Plastics product brochure, 12 pp.
All Organic Corrosion Inhibitor for Ferrous Metals Application Information, Belcor 575, 9 pp.
L. J. Schowalter, et al., "Preparation and characterization of Single-Crystal Aluminum Nitride Substrates", Mater. Res. Soc. Symp. Proc. 595, W6.7.6, 2000 (Abstract).
Partial translation JP 2001-240850, "Dispersing Agent for Abrasive Grain for Polishing and Slurry for Polishing," Sep. 4, 2001.

* cited by examiner

*Primary Examiner* — Roberts Culbert
(74) *Attorney, Agent, or Firm* — Abel Law Group, LLP

(57) ABSTRACT

A method of machining a workpiece includes applying a fluid between a fixed abrasive component and a workpiece, followed by translation of the fixed abrasive component and the workpiece relative to each other. The fluid contains an anti-clogging agent containing a phosphorus-containing organic chemistry.

22 Claims, No Drawings

METHODS FOR MACHINING INORGANIC, NON-METALLIC WORKPIECES

CROSS-REFERENCE TO RELATED APPLICATION(S)

The present application claims priority from U.S. Provisional Patent Application No. 60/871,067, filed Dec. 20, 2006, entitled "METHODS FOR MACHINING INORGANIC, NON-METALLIC WORKPIECES", and naming inventors Ronald W. Laconto and Douglas E. Ward, which application is incorporated by reference herein in its entirety.

BACKGROUND

1. Field of the Disclosure

The present invention is generally directed to methods for machining workpieces, as well as fluids utilized during machining operations.

2. Description of the Related Art

Machining operations, broadly including grinding, lapping and polishing operations, are widely used throughout various industries in order to obtain desired surface finishes and to shape components. Machining operations are widely utilized in the context of non-metal, inorganic components, such as glass, glass-ceramic and ceramic components, which are deployed in a wide variety of end uses. For example, glass and glass-ceramic components are utilized widely as building materials in both commercial and residential applications. Also, glass materials are widely utilized in electronic packaging, optical applications, and solar applications, and as advanced materials in lighting and architectural applications, and increasingly as flat panel displays.

The various design requirements placed upon demanding applications for glass, glass-ceramics and ceramics have further heightened the need for precise machining operations that ideally characterized by high material removal rates and controlled or minimized surface defects due to undesirable scratching, pitting, galling, or other surface defect mechanisms.

Particularly in the context of flat workpiece preparation, lapping and polishing operations are widely used, which incorporates use of a fixed abrasive, in which the abrasive grains are fixed in position. Here, a fixed abrasive is generally defined as one of two types of abrasive components, a bonded abrasive or a coated abrasive component. Coated abrasives generally have a flexible backing to which abrasive grains are bonded, while bonded abrasives are generally composed of abrasive grains that are bonded together such as by a matrix that forms an intergranular bonding phase. Such fixed abrasives should be contrasted against free abrasives or abrasive slurries, in which the abrasive grains are generally loose, often times in a fluidic suspension, such as an aqueous suspension. Fixed abrasives provide numerous advantages during machining operations including potentially improved planarity and improved process control. However, a need continues to exist in the art for improved machining operations utilizing fixed abrasive components, particularly in the context of glass, glass-ceramic and ceramic components.

SUMMARY

According to a first aspect of the present invention, a method for machining a workpiece is provided in which a fluid is applied between a fixed abrasive component and a workpiece, and the fixed abrasive component and the workpiece are moved relative to each other to remove material from the workpiece. According to a particular feature, the workpiece is comprised mainly of a glass, glass-ceramic or ceramic composition, and the fluid includes an anti-clogging agent. The anti-clogging agent is comprised of a phosphorus-containing organic chemistry.

According to another embodiment, a method of machining a glass workpiece is provided in which a fluid is provided between a fixed abrasive component and the glass workpiece, and the fixed abrasive component and the glass workpiece are translated relative to each other to remove material from the workpiece. The anti-clogging agent may be comprised of an organic chemistry having a phosphonate functional group.

According to yet another aspect of the present invention, a method of machining a glass workpiece is provided, in which a non-abrasive lapping fluid is provided between a fixed abrasive component and a glass workpiece, and the fixed abrasive component and the glass workpiece are moved relative to each other. The lapping fluid generally comprises an anti-clogging agent and a lubricious component, the anti-clogging agent comprising an organic chemistry having a phosphonate functional group and the lubricious component being selected from a group consisting of non-ionic functional chemistries, anionic functional chemistries, cationic functional chemistries, and amphoteric functional chemistries.

DESCRIPTION OF THE PREFERRED EMBODIMENT(S)

According to an aspect of the present invention, a method for machining a workpiece is provided, which begins with application of a fluid between a fixed abrasive component and a workpiece. Generally, a fixed abrasive component is defined as noted above, that is, a component in which the abrasive grains are fixed in position, generally fixed in position relative to each other (bonded abrasive), or fixed in position relative to each other and to a backing member (coated abrasive). The actual configuration of the fixed abrasive may vary widely depending upon the application. For example, coated abrasives may utilize a paper, cloth, stitch bonded cloth, non-woven and woven materials, fiber or film backing, and the coated abrasive may take on several different geometric forms, including belts, discs, sheets, interlined sleeves, rolls, flap discs, flap wheels, and other geometric configurations. On the other hand, bonded abrasives are typically in the form of solid, integrated structures, such as in the form of grinding wheels, cylindrical wheels, cup wheels, dish wheels, segments, cones, mounted wheels, and points, bricks, and sticks. The bond matrix of the bonded abrasive component may be in the form of a glassy phase, such as a vitrified bond, or alternatively, may in the form of a resin bond, or a combination thereof.

Furthermore, in the particular context of coated abrasives, the fixed abrasive may be in the form of an engineered abrasive, which generally has a pattern of raised surface features, such in the form of pyramids, mounds, ridges, or other surface features.

Turning to the workpiece, generally aspects of the present invention are limited to non-metallic, inorganic materials, such as glass, glass-ceramic or ceramic compositions. Of the foregoing, those compositions having a notable glass phase, such as glass and glass-ceramic composites are machined according to certain embodiments of the present invention, and indeed, often times the workpiece may consist essentially of glass, that is, contains no other non-amorphous species that substantially affects its machinability. With respect to glass workpieces, the glass may be silica-based, having a silica microstructural backbone. Particular species of silica-based glass include borosilicate glass containing a notable content of $B_2O_3$, and optionally other oxides such as $Na_2O/K_2O$ and $Al_2O_3$. Other species include soda-lime glass, containing notable contents of $Na_2O$, CaO, MgO, and $Al_2O_3$.

The actual geometric configuration of the workpiece may vary, such as in the form of convex or concave contours, including tubing, optical fibers, and other configurations. Often, at least one major surface of the workpiece is planar, and that surface may be subjected to machining operations as described herein. Workpieces may be in the form of microlithography components, such as soda-line glass or I-line glass, fused silica, and calcium fluoride, wafer blank substrates, laser windows, and other forms. The workpiece may also be in the form of flat glass, such as utilized in commercial and residential construction industries, and may broadly include glass-ceramic compositions. Yet other common workpieces include glass components for optical devices, ranging from interference filters to parallel plane workpieces and instrument glasses, for example.

The composition of the grains of the fixed abrasive may vary among suitable materials, including aluminum oxide, zirconia, cerium oxide, silicon oxide, silicon carbide, boron carbide, garnet, cubic boron nitride, diamond and any other common abrasive being used. Embodiments of the present invention use particularly aggressive abrasives, and demonstrate high levels of efficacy in such contexts, such is as with diamond abrasives, carbide abrasives such as boron carbide (including cubic boron carbide), and silicon carbide, as well as garnet.

Further, the median particle size of the fixed abrasive grains may be fine, such as within a range of about 0.01 microns to about 1.5 microns, typically within a slightly narrower range, such as within a range of about 0.1 to 1.0 microns such as 0.10 to 0.50 microns. Specification of the median particle size to be under 1 micron generally denotes a polishing process in which a fine surface finish is provided by carrying out a machining operation at low material removal rates. However, according to other embodiments, the median particle size of the fixed abrasive may be higher, above 1 micron, such as on the order of 2 to 50 microns, or 2 to 10 microns. In this case, typically the machining operation is characterized as a lapping operation.

According to various embodiments, methods for machining a workpiece continue with the application of a fluid between the fixed abrasive component and the workpiece, followed by a translation of the fixed abrasive component and the workpiece relative to each other to remove material from the workpiece. In this respect, the fixed abrasive may be held stationary and the workpiece translated, the workpiece may be held stationary and the fixed abrasive component translated, or alternatively, both the fixed abrasive component and the workpiece may be translated. Translation may be carried out along different paths such as linear translation, as in the case of translating a closed loop coated abrasive belt on a stationary workpiece, may be rotational, as in the case of a rotating grinding disk or wheel, or a may be a combination of rotational and orbital, as in the case of a rotating fixed abrasive component, with the workpiece or fixed abrasive component orbiting about a central axis.

According to a particular feature, the fluid contains an anti-clogging agent, the anti-clogging agent generally comprising a phosphorus containing organic chemistry. The phosphorus-containing organic chemistry may have a functional group selected from the group consisting of phosphonates, phosphates, phosphoramides, phosphonamides, thiophosphates, thiophosphonates and phosphites. According to a particular embodiment, the functional group is a phosphonate.

For example, phosphonates may be selected from the group consisting of gylcine-N,N-di (GDMP), aminotri (ATMP), N-2 hydroxyethyl-N,N-di (HEMPA), ethylenediaminetetra (EDTMPA), hexamethylenediaminetetra, diethylenetriaminepenta, phosphonoformate salts, hydroxyphosphono acetic acid (HPA), 2-phosphonobutane-1,2,4-tricarboxylic acid (PBTC), 1-hydroxyethylidine-1,1'-diphosphonic acid (HEDP) and salts thereof. According to particular working embodiments described herein, the anti-clogging agent includes at least HEDP.

According to another feature, the fluid may also include a lubricious component, the component being selected from the group consisting of 1) nonionic functional chemistries including alcohols, thiols, esters, amides, amines, amine oxides or imides and derivatives thereof, 2) anionic functional chemistries including phosphates, phosphonates, sulfates, sulfonates or carboxylates and derivatives thereof, 3) cationic functional chemistries such as quaternary amines or amine salts and derivatives thereof, and 4) amphoteric functional chemistries including proprionates, betaines, glycinates or sultaines and derivatives thereof.

Typically, the lubricious component is selected from nonionic and anionic functional chemistries, and in the context of non-ionic functional chemistries, may be selected from the group consisting of alcohols, thiols, esters, imides, amides, imides, and derivatives thereof.

The fluid preferably utilizes water as the carrier solvent, but other appropriate solvents, such as glycols, alcohols and carbonates can be used. The primary consideration in solvent use is the ability of the solvent to solubilize the anti-clogging agent and lubricious components. The solvent also assists the anti-clogging agent through solvation and transport of debris from the fixed abrasive component. A particular concentration of the anti-clogging agent is between 0.001% w/w and 10% w/w, such as 0.1% w/w and 1.0% w/w (w/w=weight of anti-clogging agent/weight of fluid). Similarly, the lubricious component is typically used at concentrations between 0.01% w/w and 49% w/w. The solvent concentration is considered to be the balance of the concentration up to 100% w/w. In some embodiments the solvent and lubricious component are considered the same, as in the use of ethylene glycol for the balance of the concentration up to 100% w/w. Usable pH values, the negative log of the hydrogen ion concentration, lie within a range of 1.0 to 14.0, and for certain fluids a particular pH range is between 7.0 and 13.0. In instances where the pH of the fluid exceeds that of the anti-clogging agent dissolved in water, a base is used to attain the desired pH. For purposes of this invention, a base is considered a Lewis base, or any chemical substance capable of donating electron density. Examples of suitable bases include sodium hydroxide, ammonia or ethanolamine, but many others are acceptable. The preferred base is potassium hydroxide.

EXAMPLES

Composition A
0.175% 1-hydroxyethylidine-1,1'-diphosphonic acid (HEDP)
0.125% potassium hydroxide (KOH)
99.700% water
pH=7.0

Composition B
0.175% 1-hydroxyethylidine-1,1'-diphosphonic acid (HEDP)
0.185% potassium hydroxide (KOH)
0.100% Ucon 50-HB-660
99.540% water pH=11.0
Composition C
0.175% 1-hydroxyethylidine-1,1'-diphosphonic acid (HEDP)
0.185% potassium hydroxide (KOH)
0.200% Tomah AO-405
99.440% water
pH=11.0
Composition D
0.175% 1-hydroxyethylidine-1,1'-diphosphonic acid (HEDP)
0.125% potassium hydroxide (KOH)
0.220% Acusol 445
99.480% water
pH=7.0

The test apparatus was a production size doublesided lapping machine (Speedfam 16B) equipped with fixed abrasive pads. Comparative lapping tests were carried out with only water and a coolant as the carrier fluid, while examples corresponding to embodiments of the present invention as described above incorporate a phosphorus-containing organic chemistry, particularly HEDP in connection with the Examples noted above. The machining was of various types of optical glass and the purpose was to remove stock quickly prior to a polishing step.

In the comparative lapping tests, after one or two production cycles, the abrasive pad would load with debris from grinding and two things would happen: 1) flatness would deteriorate 2) Material removal would drop dramatically because the abrasive was exposed much less. In contrast, the HEDP additive improved and maintained material removal performance for up to a week of grinding. In addition, it was found that the HEDP addition was effective with just water, where the lubricant was left out.

According to embodiments herein, applicants have discovered that utilization of a machining fluid incorporating an anti-clogging agent in the context of particular fixed abrasive machining applications of workpieces as described above, has notable impact on machining performance. It is generally known within the machining industry to utilize fixed abrasives in the context of machining operations, optionally with fluid additives to aid in material removal and swarf removal, for example. In addition, it is generally understood that in certain machining operations, it is desirable to utilize chemical species that have a chemical interaction with the workpiece undergoing machining, to aid in material removal and optionally aid in planarization of the workpiece, as in the case of CMP operations utilizing a loose abrasive. In contrast, according to embodiments of the present invention, it has been discovered that in fixed abrasive machining operations, utilization of the particular anti-clogging agents as described above has a notable impact on preventing clogging of the fixed abrasive.

In the particular context of machining borosilicate glass, fixed diamond pads have been utilized in grinding operations, such as 3M Trizact pads. However, during machining, oftentimes such pads would fully load or clog with material removed from the workpiece (substrate), sometimes within only two to three cycles. Such clogging has notable negative impacts, such as negatively impacting flatness of the workpiece. To address clogging and loading issues, pads may be dressed with a ceramic component, such as an alumina dressing pad, to remove clogged material. However, such dressing pads generally wear quickly and are costly to purchase in light of the fact that they are essentially consumables in the context of dressing applications. Applicants have noted substantial clogging of such pads even when used in combination with state of the art lubricious fluids, such as those described above, including, for example, Saberlube 9016.

Incorporation of an anti-clogging agent in the context of machining operations of borosilicate glass has been found to greatly improve the duration of machining between dressing operations. Indeed, it was found that machining could be operated for an entire week without dressing, which represents a 90% improvement over the state of the art with the same number of cycles per day.

While functional chemistries such as phosphonate functional chemistries have been utilized in the context of machining operations with free abrasive slurries to aid in material removal, aspects of the present invention take advantage of an anti-clogging phenomenon in the context of fixed abrasive machining. Such combination with fixed abrasive machining notably improves processability of inorganic, non-metallic workpieces such as glasses, glass-ceramics and ceramics.

While embodiments of the invention have been illustrated and described as phosphonate based anti-clogging agents and compositions incorporating same, the invention is not intended to be limited to the details shown, since various modifications and substitutions can be made without departing in any way from the scope of the present invention. For example, additional or equivalent substituents can be provided and additional or equivalent production steps can be employed. As such, further modifications and equivalents of the invention herein disclosed may occur to persons skilled in the art using no more than routine experimentation, and all such modifications and equivalents are believed to be within the scope of the invention as defined by the following claims:

What is claimed is:

1. A method of machining a workpiece:
   applying a fluid between a fixed abrasive component and a workpiece comprised mainly of a glass or glass ceramic, the fluid consisting essentially of an anti-clogging agent, a lubricious component, a base, and a carrier solvent, wherein the anti-clogging agent comprises a phosphorous-containing organic chemistry; and
   translating the fixed abrasive component and the workpiece relative to each other to remove material from the workpiece.

2. The method of claim 1, wherein the phosphorous-containing organic chemistry has a functional group selected from the group consisting of phosphonates, phosphates, phosphoramides, phosphonamides, thiophosphates, thiophosphonates and phosphites.

3. The method of claim 2, wherein the functional group comprises phosphonate.

4. The method of claim 3, wherein the phosphonate is selected from the group consisting of gylcine-N,N-di (GDMP), aminotri (ATMP), N-2 hydroxyethyl-N,N-di (HEMPA), ethylenediaminetetra (EDTMPA), hexamethylenediaminetetra, diethylenetriaminepenta, phosphonoformate salts, hydroxyphosphono acetic acid (HPA), 2-phosphonobutane-1,2,4-tricarboxylic acid (PBTC), 1-hydroxyethylidine-1,1'-diphosphonic acid (HEDP), and salts thereof.

5. The method of claim 4, wherein the phoshponate comprises 1-hydroxyethylidine-1,1'-diphosphonic acid (HEDP) and salts thereof.

6. The method of claim 1, wherein machining comprises lapping and the fixed abrasive comprises abrasive grains having a median particle size within a range of about 1.5 micron to 50 microns.

7. The method of claim 1, wherein machining comprises polishing and the fixed abrasive comprises abrasive grains having a median particle size within a range of about 0.01 to 1.5 microns.

8. The method of claim 1, wherein the fluid comprises a lubricious component, the lubricious component being selected from the group consisting of 1) nonionic functional chemistries including alcohols, thiols, esters, amides, amines, amine oxides or imides and derivatives thereof, 2) anionic functional chemistries including phosphates, phosphonates, sulfates, sulfonates or carboxylates and derivatives thereof, 3) cationic functional chemistries such as quaternary amines or amine salts and derivatives thereof, and 4) amphoteric functional chemistries including proprionates, betaines, glycinates or sultaines and derivatives thereof.

9. The method of claim 8, wherein the lubricious component is selected from the group consisting said 1) nonionic functional chemistries and 2) anionic functional chemistries.

10. The method of claim 9, wherein the lubricious component comprises a nonionic functional chemistry, said nonionic functional chemistry being selected from the group consisting of alcohols, thiols, esters, amides, amines, amine oxides or imides and derivatives thereof.

11. The method of claim 1, wherein the fixed abrasive component comprises a coated abrasive or a bonded abrasive.

12. The method of claim 11, wherein the fixed abrasive comprises a bonded abrasive, the bonded abrasive comprising abrasive grains bonded together via a binder system.

13. The method of claim 11, wherein the fixed abrasive comprises fixed abrasive grains from the group consisting of diamond, boron carbide, cubic boron nitride, silicon carbide, silicon nitride, silicon oxide, aluminum oxide, aluminum nitride, zirconium oxide, cerium oxide, chromium oxide, iron oxide, and composites thereof.

14. The method of claim 1, wherein the workpiece consists essentially of glass.

15. The method of claim 14, wherein the workpiece consists essentially of silica-based glass.

16. The method of claim 1, wherein translating comprises maintaining the workpiece in a fixed position and translating the fixed abrasive relative to the workpiece.

17. The method of claim 16, wherein the fixed abrasive is rotated with respect to the workpiece.

18. The method of claim 1, wherein translating comprises maintaining the fixed abrasive in a fixed position and translating the workpiece.

19. The method of claim 1, wherein the anti-clogging agent comprises 1-hydroxyethylidine-1,1'-diphosphonic acid (HEDP) and salts thereof.

20. A method of machining a glass workpiece:
applying a fluid between a fixed abrasive component and the glass workpiece, the fluid consisting essentially of an anti-clogging agent, a lubricious component, a base, and a carrier solvent, wherein the anti-clogging agent comprises an organic chemistry having phosphonate functional group; and
translating the fixed abrasive component and the glass workpiece relative to each other to remove material from the workpiece.

21. The method of claim 20, wherein the glass workpiece consists essentially of silica-based glass.

22. A method of machining a glass workpiece:
applying a non-abrasive lapping fluid between a fixed abrasive component and the glass workpiece, the lapping fluid consisting essentially of an anti-clogging agent, a base, a carrier solvent, and a lubricious component, the anti-clogging agent comprising an organic chemistry having phosphonate functional group and the lubricious component being selected from the group consisting of 1) nonionic functional chemistries, 2) anionic functional chemistries, 3) cationic functional chemistries, and 4) amphoteric functional chemistries; and
translating the fixed abrasive component and the glass workpiece relative to each other to remove material from the workpiece.

* * * * *